(12) United States Patent
Pedercini et al.

(10) Patent No.: US 10,106,390 B2
(45) Date of Patent: Oct. 23, 2018

(54) LABELING MACHINE (71) Applicant: SACMI IMOLA S.C., Imola (IT)

(72) Inventors: Maurizio Pedercini, Marmirolo (IT); Mirco Massari, Parma (IT); Daniele Mazzucco, Marmirolo (IT)

(73) Assignee: SACMI IMOLA S.C., Imola (IT)

( * ) Notice: Subject to any disclaimer, the term of this patent is extended or adjusted under 35 U.S.C. 154(b) by 0 days.

(21) Appl. No.: 15/502,128

(22) PCT Filed: Jul. 31, 2015

(86) PCT No.: PCT/EP2015/067711
§ 371 (c)(1),
(2) Date: Feb. 6, 2017

(87) PCT Pub. No.: WO2016/020293
PCT Pub. Date: Feb. 11, 2016

(65) Prior Publication Data
US 2017/0225935 A1 Aug. 10, 2017

(30) Foreign Application Priority Data
Aug. 8, 2014 (IT) .............................. VR2014A0208

(51) Int. Cl.
*B65G 47/84* (2006.01)
*B65G 47/74* (2006.01)
(Continued)

(52) U.S. Cl.
CPC .............. *B67C 7/0053* (2013.01); *B65C 9/04* (2013.01); *B65G 47/846* (2013.01)

(58) Field of Classification Search
None
See application file for complete search history.

(56) References Cited

U.S. PATENT DOCUMENTS 3,200,027 A * 8/1965 Fairest ...................... B65C 3/14
156/449
3,757,929 A * 9/1973 Hull ........................ C03B 35/12
198/803.12
(Continued)

FOREIGN PATENT DOCUMENTS

DE 19512515 A1 5/1996
DE 102012003354 A1 8/2013
(Continued)

OTHER PUBLICATIONS

International Search Report dated Oct. 6, 2015 re: Application No. PCT/EP2015/067711; pp. 1-4; citing: EP 1 264 771 A1, DE 10 2012 003354 A1, US 2004/065525 A1 and DE 195 12 515 A1.
(Continued)

Primary Examiner — Kavel Singh
(74) Attorney, Agent, or Firm — Cantor Colburn LLP (57) ABSTRACT A machine for labeling containers includes a rotating carousel with a lower base which supports a plurality of supporting pans for the containers and an upper supporting structure for a plurality of heads which are intended to engage the top portion of the containers. The labeling machine further includes a device for feeding the containers to be labeled to the rotating carousel and a device for unloading the labeled containers. The feeding device includes at least one first device for conveying the containers to be labeled which is provided with first elements for supporting the containers to be labeled at the neck. The labeling machine includes first elements for varying the height of the bottom of the containers to be labeled in order to bring the bottom to substantially the same height as the supporting pans.

15 Claims, 7 Drawing Sheets (51) Int. Cl.
*B65G 29/00* (2006.01)
*B65G 47/02* (2006.01)
*B67C 7/00* (2006.01)
*B65C 9/04* (2006.01)

(56) References Cited

U.S. PATENT DOCUMENTS

| | | | |
|---|---|---|---|
| 8,240,459 B2 * | 8/2012 | Bernhard | B65G 29/00 198/481.1 |
| 8,561,783 B2 * | 10/2013 | McAllister | B65G 47/846 198/473.1 |
| 2004/0065525 A1 | 4/2004 | Bonatti et al. | |

FOREIGN PATENT DOCUMENTS

| | | | | |
|---|---|---|---|---|
| EP | 1264771 | A1 | 12/2002 | |
| EP | 1889802 | A2 * | 2/2008 | B65C 9/02 |
| EP | 1889802 | A2 * | 2/2008 | B65C 9/02 |
| WO | 2007025602 | A1 | 3/2007 | |

OTHER PUBLICATIONS

Written Opinion dated Oct. 6, 2015 re: Application No. PCT/EP2015/067711; pp. 1-6; citing: EP 1 264 771 A1, DE 10 2012 003354 A1, US 2004/065525 A1 and DE 195 12 515 A1.

\* cited by examiner

LABELING MACHINE

TECHNICAL FIELD

The present disclosure relates to a labeling machine.

BACKGROUND

Typically, labeling machines comprise a rotating carousel, the input of which is connected to a device for feeding the containers to be labeled and the output of which is connected to a device for unloading the labeled containers.

The feeding devices are usually constituted by a feeding star conveyor, which is associated with a flat supporting element for the containers, and by belts or screw feeders for supplying the containers to the feeding star conveyor.

Similarly, the unloading devices comprise an unloading star conveyor, which is also associated with a flat element, and is intended to send the labeled containers coming from the labeling machine to an unloading belt or to further star conveyors for moving the containers.

In some cases the containers to be labeled, if they originate for example directly from a blow-molding machine, are conveyed to the labeling machine by way of one or more fixed-height star conveyors, which are provided with clamps which are adapted to support the containers at the neck.

Alternatively, the star conveyors can be constituted by disk-like elements which define, at their peripheral regions, receptacles that can be engaged by a respective portion of the neck of the container so that the "lip" can be supported on the edge of the receptacles; extending around the peripheral region of the disk is an outer ring which is intended to support the remaining part of the neck of the container.

Similarly, the unloading of the labeled containers can also involve the use of one or more fixed-height star conveyors which are structured in a similar manner to those used for feeding the containers to be labeled.

To make the application of the labels reliable, it is necessary to immobilize the containers between a supporting pan and a respective upper centering head when the containers to be labeled are in the rotating carousel.

In order to make it possible to label containers that have different heights, solutions have been proposed which involve maintaining the star conveyors for feeding and/or unloading at a fixed height, and varying the height of the supporting pans.

Solutions of this type are for example disclosed in EPA 02011658.8 and in EP 1919778.

Such implementation solutions, although conceptually valid, suffer a number of drawbacks.

In particular, in one solution it is necessary to intervene either in the structure of the labeling machine to allow the vertical movement, usually not envisaged, of the pans, or in the base supporting the pans, while in the other solution, one has to intervene manually by inserting spacers, in order to adapt the height of the supporting pans to the height of the container to be labeled.

Another disadvantage of the conventional solutions is due to the fact that the labeling assembly or assemblies associated with the rotating carousel operate at a height which on average is higher than the solutions that have the supporting pans at a fixed height, and this entails a certain inconvenience in operations to control and intervene on the labeling assemblies.

The aim of the present disclosure is to solve the above mentioned problems and overcome the drawbacks, by providing a labeling machine that is considerably easier and more practical to use than the conventional labeling machines used today.

Within this aim, the disclosure provides a labeling machine that is extremely reliable and which can be used with carousels of conventional structure.

SUMMARY

The disclosure further provides a labeling machine in which the labeling assemblies are arranged at a height from the ground which is such as to facilitate control and intervention operations.

These advantages and features which will become better apparent hereinafter are achieved by providing a labeling machine according to the independent claims.

BRIEF DESCRIPTION OF THE DRAWINGS

Further characteristics and advantages of the disclosure will become better apparent from the description of some preferred, but not exclusive, embodiments of a labeling machine according to the disclosure, which are illustrated by way of non-limiting example in the accompanying drawings wherein.

DETAILED DESCRIPTION OF THE DRAWINGS

In the embodiments illustrated, individual characteristics shown in relation to specific examples may in reality be interchanged with other, different characteristics, existing in other embodiments.

With reference to the figures, the present disclosure relates to a machine, generally indicated with the reference numeral 1, for labeling containers 10, which comprises a rotating carousel 3.

The rotating carousel 3 comprises a lower base 4 which supports a plurality of supporting pans 4a for the containers 10 and an upper supporting structure 5 for a plurality of heads 5a which are intended to engage the top portion 10a of the containers 10.

The rotating carousel 3 is associated with at least one labeling assembly 2 and can rotate about a main axis 100.

The labeling machine 1 further comprises a device 20 for feeding the containers to be labeled 10 to the rotating carousel 3 and a device 30 for unloading the labeled containers 10 from the rotating carousel 3.

The feeding device 20 comprises at least one first device 21 for conveying the containers to be labeled 10 which is provided with means 22 for supporting the containers to be labeled 10 at the neck 10b.

According to the present disclosure, the feeding device 20 comprises first means 50 for varying the height of the bottom 10c of the containers to be labeled 10, which are adapted to bring each bottom 10c of the containers 10 fed to the rotating carousel 3 substantially to the same height as the supporting pans 4a.

Preferably, such first variation means 50 are associated with the first means 22 of supporting the neck 10b of the container 10 in order to bring the bottom 10c of the containers to be labeled 10 which are supported by the first supporting means 22 substantially to the same height as the supporting pans 4a.

Preferably, the first variation means 50 are associated with the first supporting means 22 of the first conveyance device 21 which is arranged directly upstream of the rotating carousel 3.

Advantageously, the supporting pans 4a are substantially at a fixed height independently of the height of the containers to be labeled 10.

Obviously there can be a relative movement of a presettable travel, of the order of a few millimeters, in a vertical direction, of the supporting pan 4a with respect to the bottom 10c if the supporting pan 4a defines a hollow for accommodating the bottom 10c.

Conveniently, the unloading device 30 comprises at least one second device 31 for conveying the labeled containers 10.

The unloading device 30 can be of the "traditional" type, i.e. for example using a belt or a screw feeder.

If the output of the labeling machine is functionally connected to further apparatuses which are constituted, for example, by a filling machine, it is possible for the second conveyance device 31 to be provided with second means 32 for supporting the labeled containers 10 which act at the neck 10b of the labeled containers 10.

Advantageously, there are second means 60 of varying the height of the second supporting means 32.

According to the characteristics of the plant and of the apparatuses arranged upstream and/or downstream of the labeling machine 1, the first variation means 50 and the second variation means 60 can produce an identical or different variation of the height, respectively, of the first supporting means 22 and of the second supporting means 32.

The solution according to the present disclosure is therefore extremely flexible, since it can adapt in an extremely effective manner to the characteristics of any apparatuses that may be arranged upstream and downstream of the labeling machine 1.

Conveniently, the first conveyance device 21 comprises at least one star conveyor 24 for feeding the containers to be labeled 10 to the rotating carousel 3.

The feeding star conveyor 24 is associated with first supporting means 22 which comprise first clamp elements 22a which are intended to engage at a respective neck 10b of a container 10.

Advantageously, the first clamp elements 22a are supported by at least one first elongated support element 22b.

Such first elongated support elements 22b are mutually angularly spaced apart about the rotation axis 101 of the feeding star conveyor 24.

The first clamp elements 22a are movable, during the rotation of the feeding star conveyor 24 about its own rotation axis 101, substantially in a vertical direction.

Figure 1:
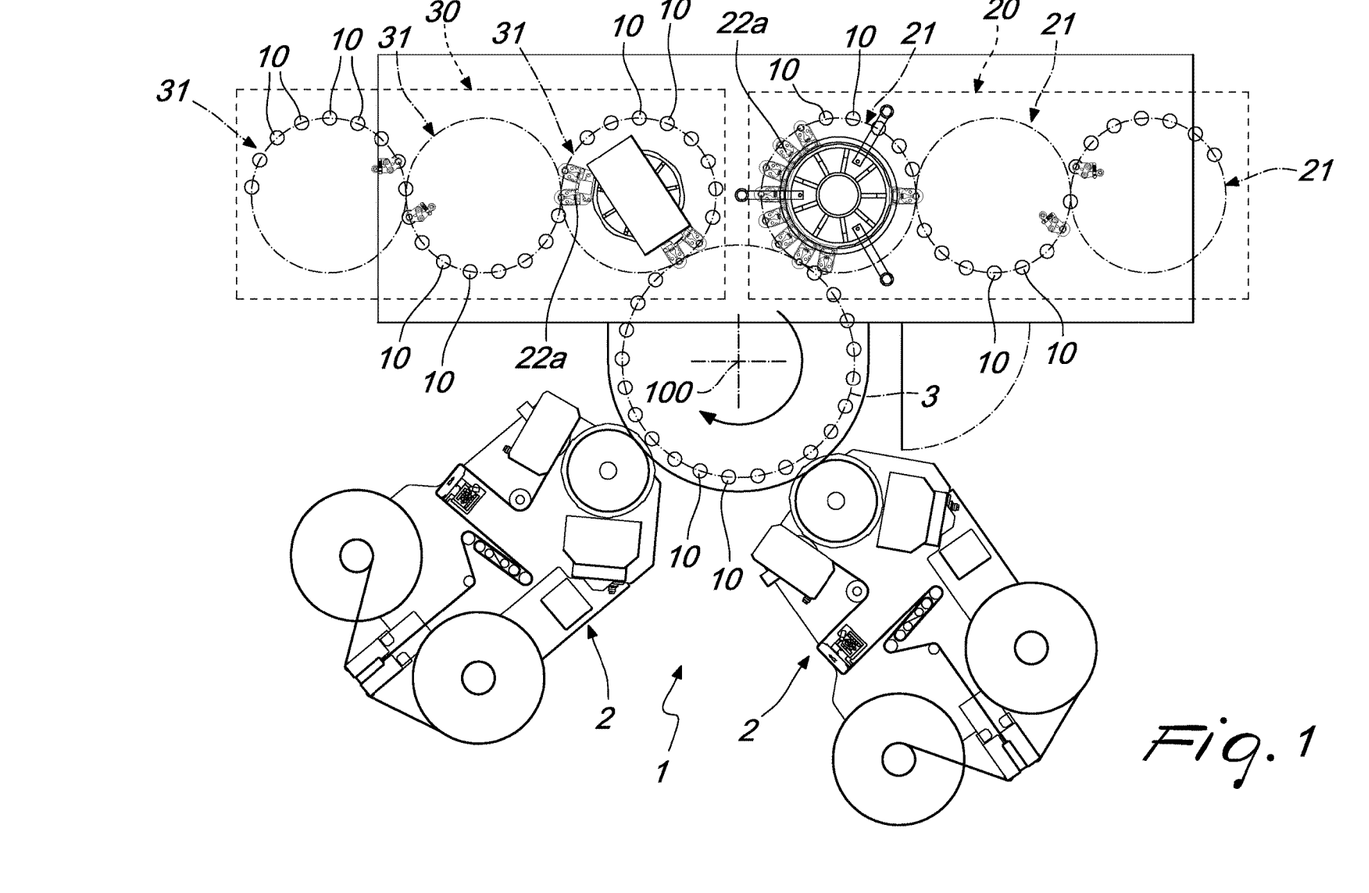
FIG. 1 is a schematic view from above of a labeling machine.
Figure 2:
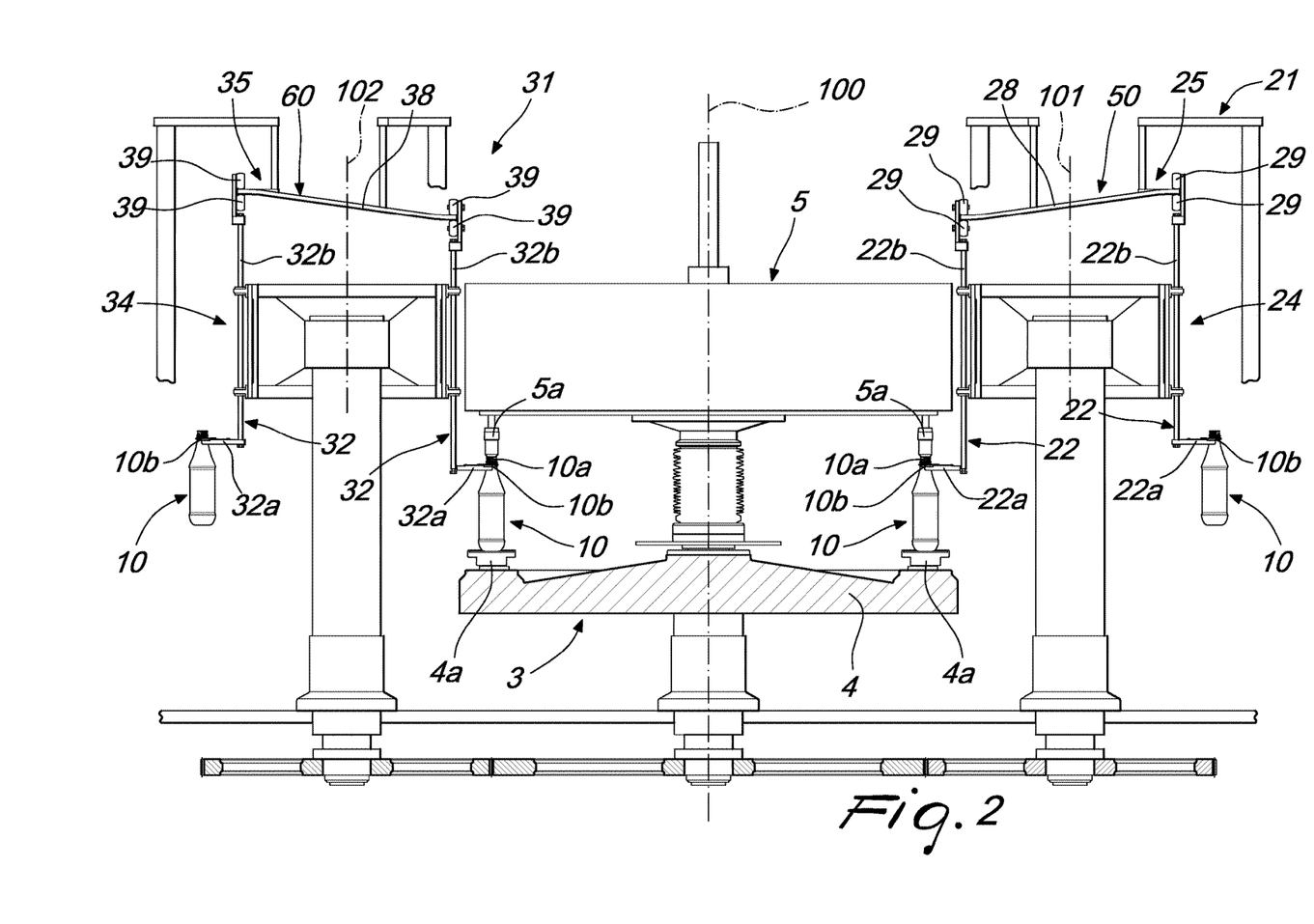
FIG. 2 is a side view, partially in cross-section, of a first embodiment of a labeling machine according to the disclosure.
Figure 3:
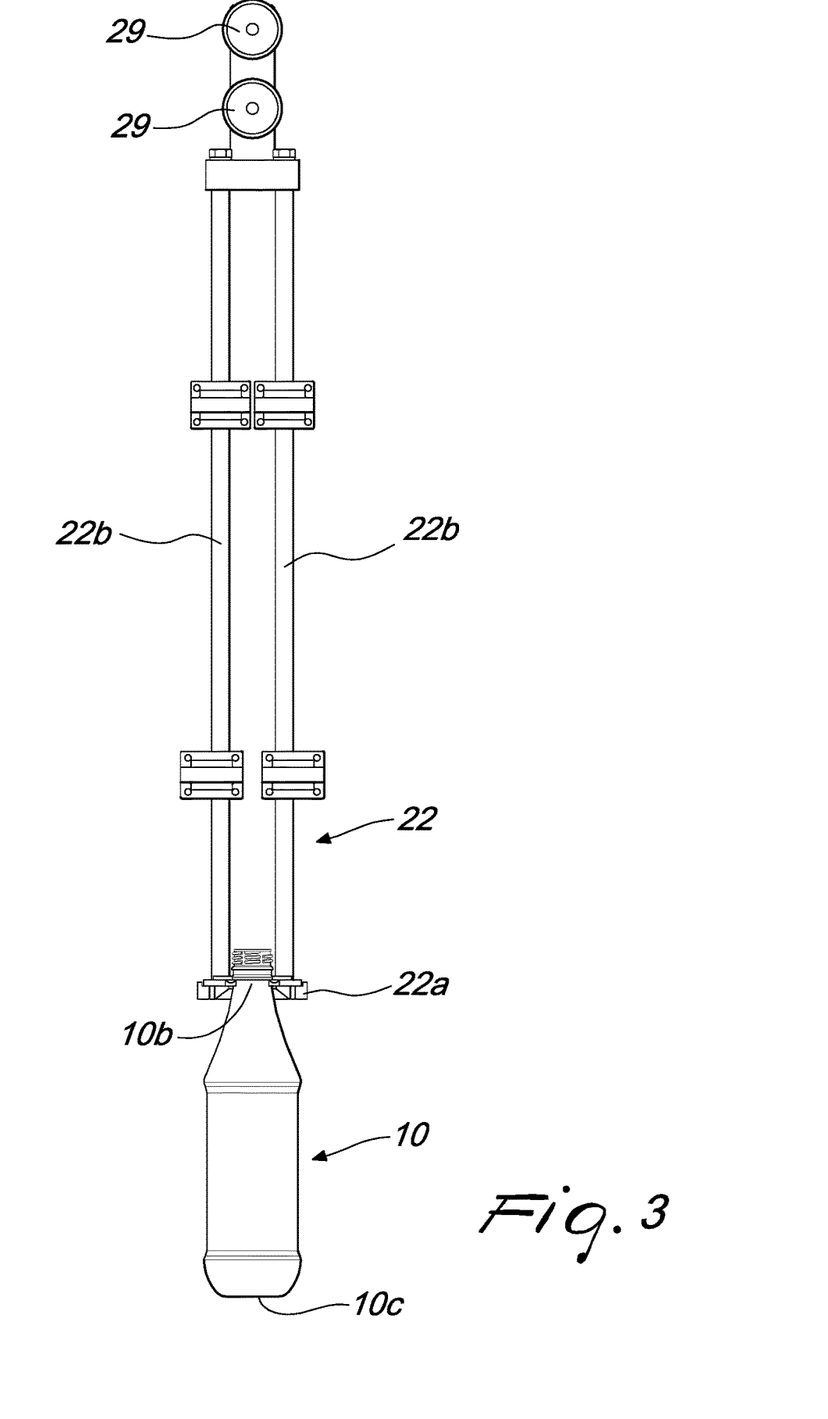
FIG. 3 is a front elevation view of a portion of the first embodiment of the feeding or unloading device.

According to a first embodiment shown in FIGS. 2 and 3, the feeding star conveyor 24 is associated with first means 25 for moving, in a substantially vertical direction, the first clamp elements 22a.

In this case, the first movement means 25 intended to provide the first variation means 50 comprise a plurality of first cam-shaped profiles 28 which can be slideably engaged by the first elongated support elements 22b during their rotation about the rotation axis 101 of the feeding star conveyor 24.

The different first cam-shaped profiles 28 have different heights and can be selectively and removably associated with the feeding star conveyor 24 as a function of the height of the containers to be labeled 10.

In particular, the first elongated support elements 22b support at least one roller 29 which can engage the first cam-shaped profile 28.

In the solution shown, each first elongated support element 22b is associated with two rollers 29 which are mutually opposite with respect to the first cam-shaped profile 28 and can rotate about an axis which is arranged radially with respect to the feeding star conveyor 24.

Figure 4:
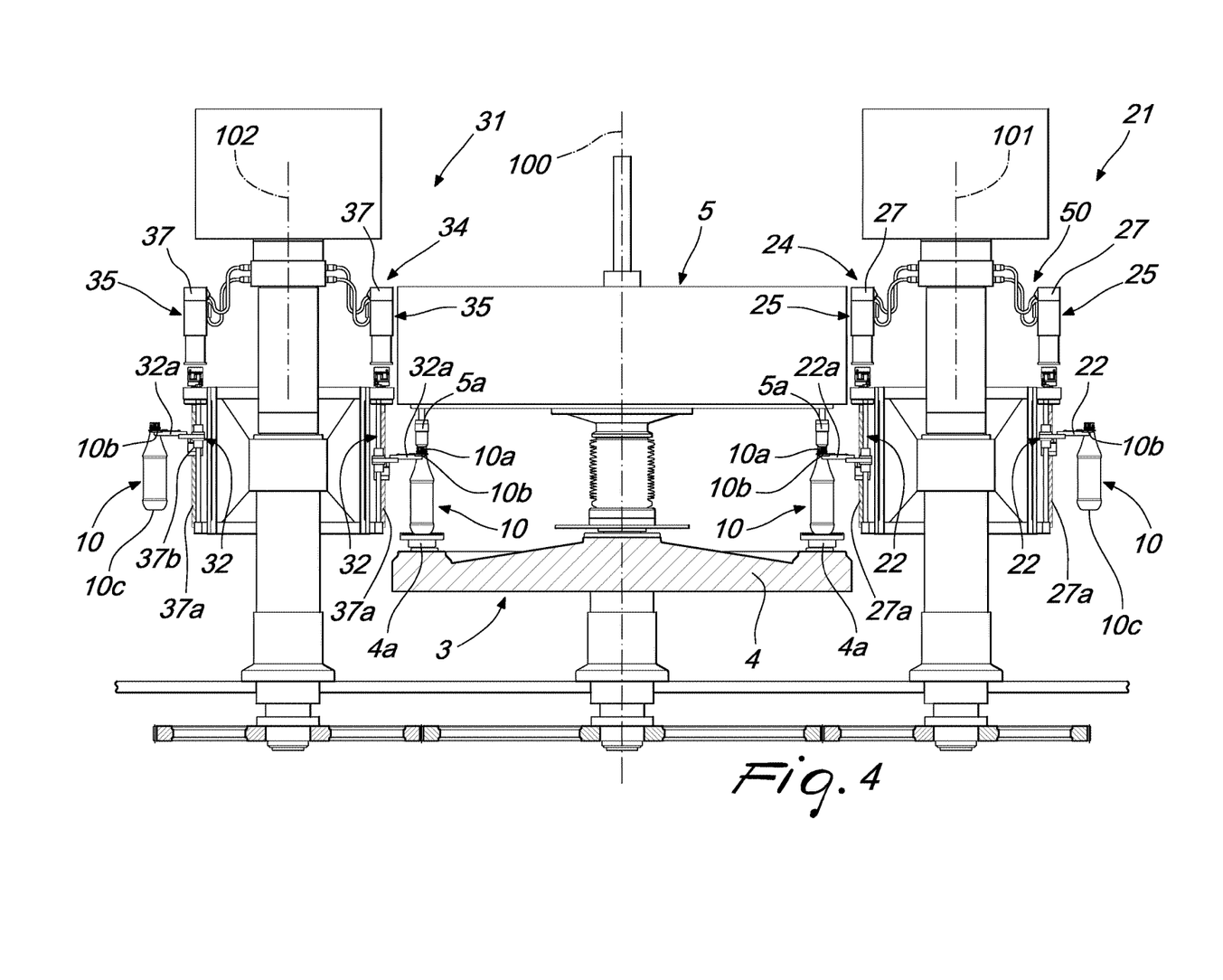
FIG. 4 is a side view, partially in cross-section, of a second embodiment of a labeling machine according to the disclosure.
Figure 5:
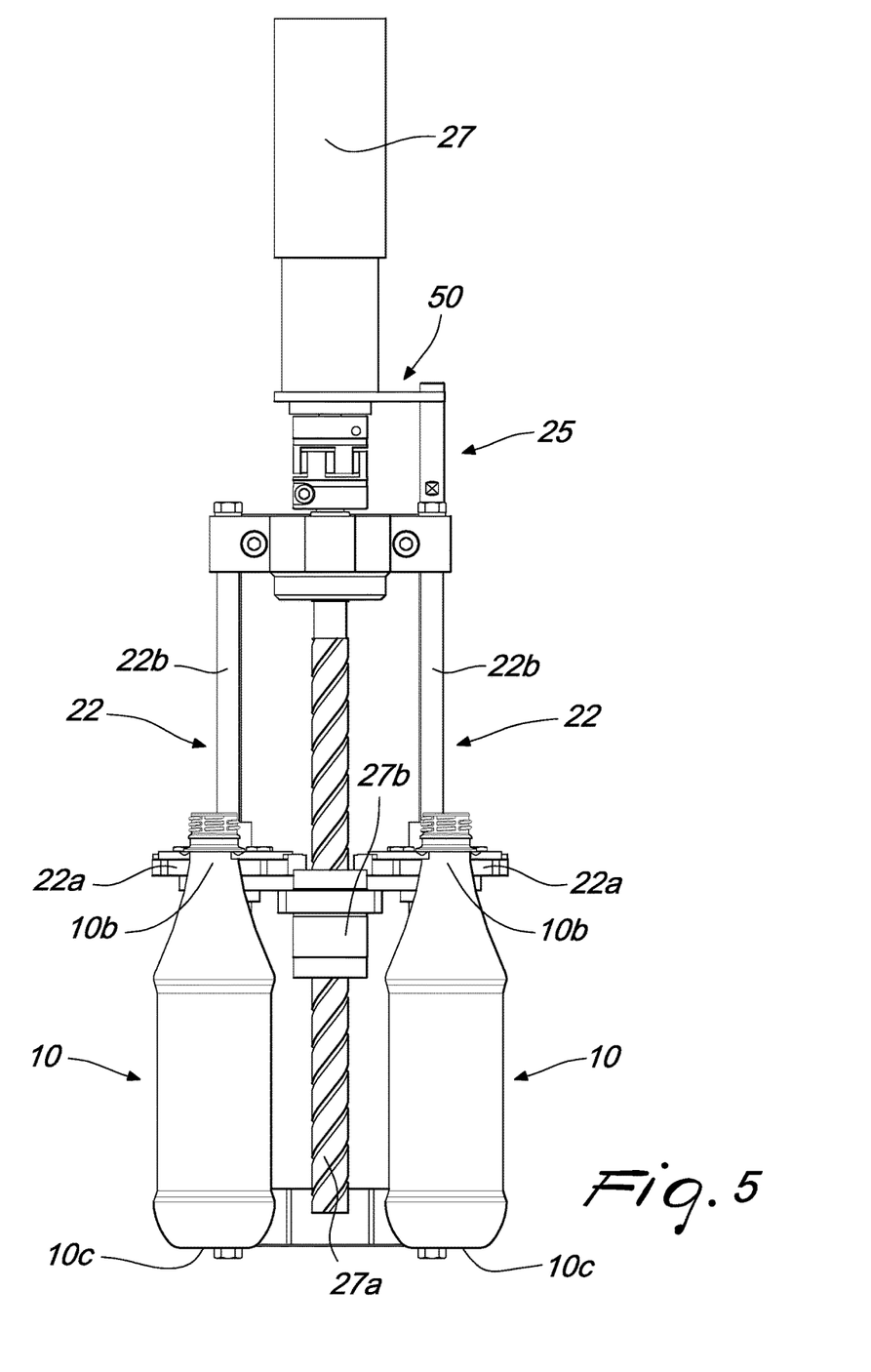
FIG. 5 is a front elevation view of a portion of the second embodiment of the labeling machine.

With reference to the embodiment shown in FIGS. 4 and 5, the first movement means 25 comprise first linear actuators which are kinematically connected to each first clamp element 22a.

In particular, the linear actuators are adapted to move the first clamp elements 22a in a vertical direction during their rotation about the rotation axis 101 of the feeding star conveyor 24.

As shown in FIG. 5, each first linear actuator can be connected to two or more first clamp elements 22a, each one of which is intended to support a respective container 10.

Such first linear actuators can be constituted or can comprise a first electric motor 27.

According to a practical embodiment, the first electric motor 27 is adapted to rotate a first elongated body 27a which meshes with a first block 27b so that the rotation of the first elongated body 27a about its own axis produces a translation of the first block 27b parallel to the axis of the first elongated body 27a.

One or more first clamp elements 22a can be associated with each first block 27b.

Each first clamp element 22a can be connected to at least one first elongated support element 22b which extends substantially vertically and has a portion thereof which is slideably coupled with a guiding element which is supported by the feeding star conveyor 24.

In this manner it is possible to ensure that the movement of the first clamp elements 22a is along a substantially vertical direction.

Obviously, there is no reason why the linear actuators cannot comprise a pneumatic motor or a linear electric motor.

Conveniently, the second conveyance device 31 comprises a star conveyor 34 for unloading the labeled containers 10 from the rotating carousel 3.

The second supporting means 32 comprise second clamp elements 32a which are intended to engage at a respective neck 10b of a container 10.

Preferably, the second clamp elements 32a are supported by at least one second elongated support element 32b.

Such second elongated support elements 32b are mutually angularly spaced apart about the rotation axis 102 of the unloading star conveyor 34.

The second clamp elements 32a are movable, during the rotation of the unloading star conveyor 34 about its own rotation axis 102, substantially in a vertical direction.

Conveniently, the unloading star conveyor 34 can be associated with second means 35 for moving, in a vertical direction, the second clamp elements 32a.

Such second movement means 35 can comprise, as shown in FIGS. 4 and 5, respective second linear actuators which are kinematically connected to each second clamp element 32a.

In particular, each second linear actuator can be connected to two or more second clamp elements 32a, each one of which is intended to support a respective container 10.

Such second linear actuators can be constituted or can comprise a second electric motor 37.

According to a practical embodiment, the second electric motor 37 is adapted to rotate a second elongated body 37a which meshes with a second block 37b so that the rotation of the second elongated body 37a about its own axis produces a translation of the second block 37b parallel to the axis of the second elongated body 37a.

One or more second clamp elements 32a can be associated with each second block 37b.

Each second clamp element 32a can be connected to at least one second elongated support element 32b which extends substantially vertically and has a portion thereof which is slideably coupled with a guiding element which is supported by the unloading star conveyor 34.

In this manner it is possible to ensure that the movement of the second clamp elements 32a is along a substantially vertical direction during their rotation about the rotation axis 102.

Obviously, there is no reason why the linear actuators cannot comprise a pneumatic motor or a linear electric motor.

With reference to the embodiment shown in FIGS. 2 and 3, the second movement means 35 intended to provide the second variation means 60 comprise a plurality of second cam-shaped profiles 38 which can be slideably engaged by the second elongated support elements 32b during their rotation about the rotation axis 102 of the unloading star conveyor 34.

The different second cam-shaped profiles 38 have different heights and can be selectively and removably associated with the unloading star conveyor 34 as a function of the height of the containers to be labeled 10.

In particular, the second elongated support elements 32b support at least one roller 39 which can engage the second cam-shaped profile 38.

In the solution shown, each second elongated support element 32b is associated with two rollers 39 which are mutually opposite with respect to the second cam-shaped profile 38 and can rotate about an axis which is arranged radially with respect to the unloading star conveyor 34.

Figure 6:
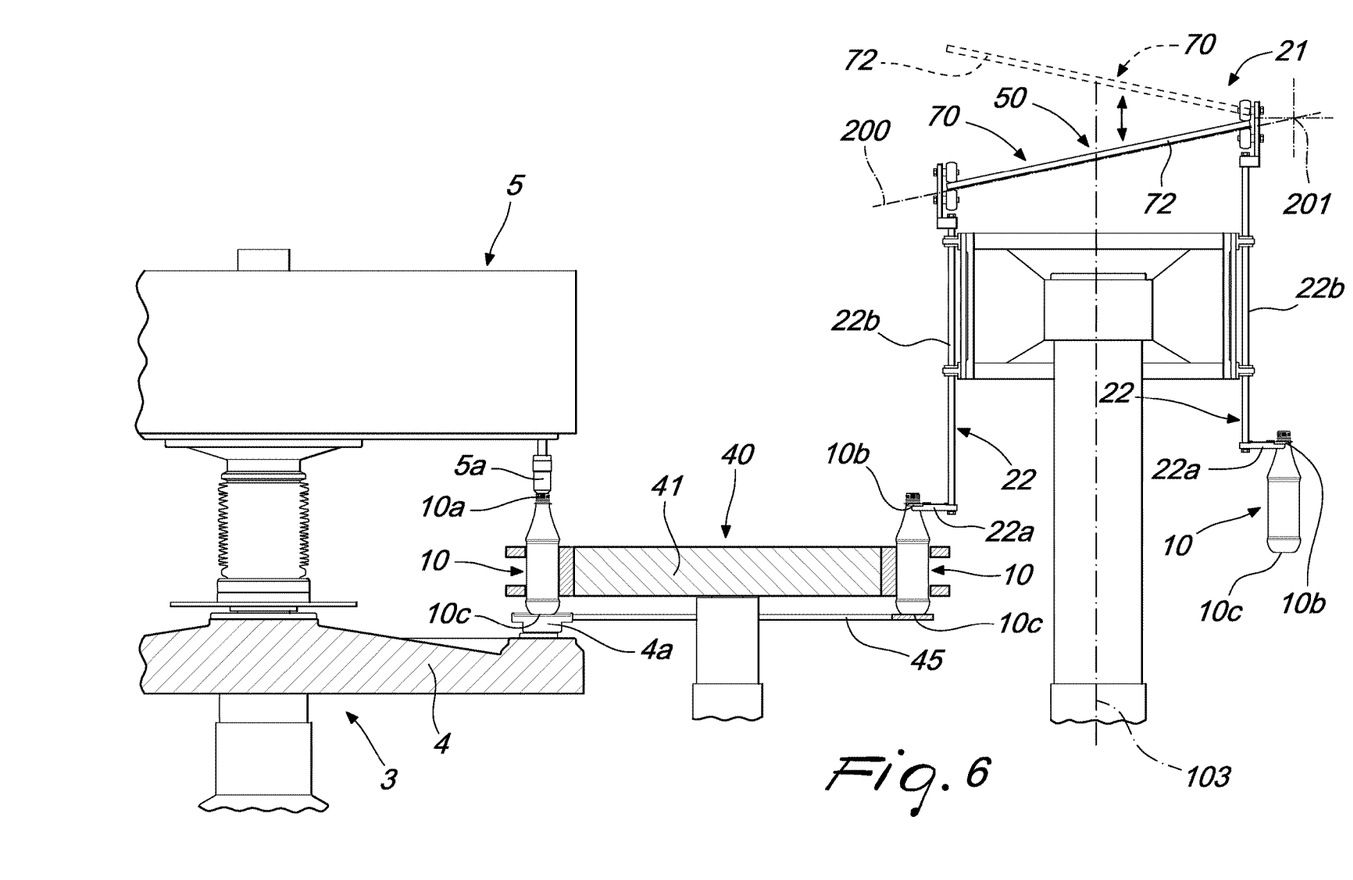
FIG. 6 is a side view, partially in cross-section, of a third embodiment of the labeling machine.
Figure 7:
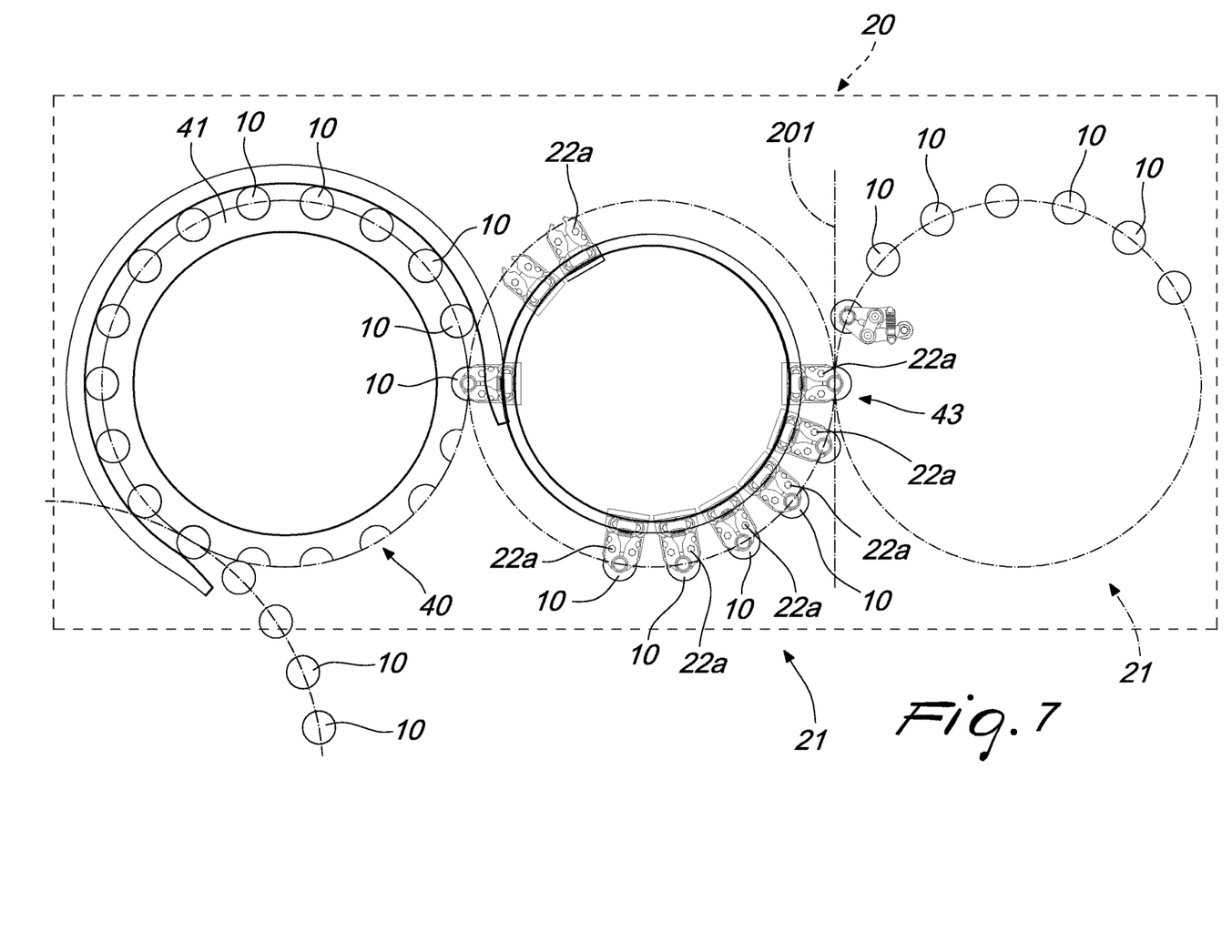
FIG. 7 is a schematic view from above of a third embodiment of a labeling machine.

According to a possible variation of embodiment shown in FIGS. 6 and 7, the first feeding device 20 comprises a transfer element 40 which comprises a transfer star conveyor 41 which has a supporting surface 45 at a fixed height for the bottom 10c of the containers 10.

The transfer element 40 is arranged upstream, and preferably directly upstream, of the rotating carousel 3.

The resting surface 45 is substantially at the same height as the supporting pans 4a.

Conveniently, the transfer star conveyor 41 defines, at its peripheral region, a plurality of recesses for accommodating at least one portion of a respective container 10 to be fed to the rotating carousel 3.

The feeding device 20 is provided, upstream of the transfer element 40, with a first conveyance device 21 which is associated with the first variation means 50.

The conveyance device 21 comprises a star-shaped body and is associated with first supporting means 22 which comprise first clamp elements 22a which are intended to engage at a respective neck 10b of a container 10.

Advantageously, the first clamp elements 22a are supported by at least one first elongated support element 22b.

Such first elongated support elements 22b are mutually angularly spaced apart about the rotation axis 103 of the star-shaped body.

The first clamp elements 22a are movable, during the rotation of the star-shaped body about its own rotation axis 103, substantially in a vertical direction.

The star-shaped body is associated with a closed profile 70 which is constituted, for example, by a flat disk-like body 72.

The closed profile 70 can be engaged slideably by the first supporting means 22, which have first clamp elements 22a which are adapted to receive the containers 10 at a transfer portion 43.

According to such variation of embodiment, the plane of arrangement 200 of the closed profile 70 can be moved on command about a tilting axis 201 which is substantially horizontal and is arranged tangentially to the vertical cylindrical surface defined by the rotary motion of the containers 10 about the rotation axis 103 of the star-shaped body.

The tilting axis 201 is arranged substantially at the transfer portion 43 and is diametrically opposite to the release region of the containers at the transfer element 40.

The solution illustrated in FIGS. 6 and 7 can preferably be used to provide the feeding device 20.

There is no reason why it cannot also be used to provide the unloading device 30, however.

It should be noted that it is possible to associate feeding devices 20 and unloading devices 30 of different types with a rotating carousel 3, also with regard to the encumbrances and to the layout of the system.

The present disclosure further relates to a feeding device 20 and/or an unloading device 30 of a rotating carousel 3 as described above.

Operation of a labeling machine 1 according to the disclosure is evident from the foregoing description.

In particular, the containers 10 to be labeled are fed by way of the feeding device 20 to the rotating carousel 3.

Before the containers 10 are positioned on the respective supporting pans 4a, the first variation means 50 bring the bottom 10c of the container 10 substantially to the same height as the supporting pans 4a.

Similarly, the labeled containers 10 can be brought, according to requirements, to a different height from that of the supporting pans 4a thanks to the second variation means 60 which are associated with the unloading device 30.

All the characteristics of the disclosure, indicated above as advantageous, convenient or similar, may also be missing or be substituted by equivalent characteristics.

The individual characteristics set out in reference to general teachings or to specific embodiments may all be present in other embodiments or may substitute characteristics in such embodiments.

In practice it has been found that in all the embodiments the disclosure is capable of fully achieving the set aims and objectives.

The disclosure, thus conceived, is susceptible of numerous modifications and variations.

In practice the materials employed, provided they are compatible with the specific use, and the dimensions and shapes, may be any according to requirements.

Moreover, all the details may be substituted by other, technically equivalent elements.

The invention claimed is:

1. A machine for labeling containers, the machine comprising: a rotating carousel with a lower base which supports a plurality of supporting pans for the containers and an upper supporting structure for a plurality of heads configured to engage the top portion of said containers, said labeling machine further comprising a device for feeding the containers to be labeled to said rotating carousel and a device for unloading the labeled containers, said feeding device comprising at least one first device for conveying said containers to be labeled which is provided with a first supporting device comprising first clamp elements configured to engage a neck of the container, further comprising a first height variation device for varying a height of a bottom of said containers to be labeled in order to bring said bottom substantially to the same height as said supporting pans, said first height variation device being associated with said first supporting device adapted to vary the height of the first clamp elements so as to vary the height of the bottom of said containers to be labeled in order to bring said bottom substantially to the same height as said supporting pans, said unloading device comprising at least one second device for conveying said labeled containers, which is provided with a second supporting device configured to support said labeled containers at the neck, a second height variation device configured to vary the height of said second supporting device being provided.

2. The labeling machine according to claim 1, wherein at least one first conveyance device comprises a feeding star conveyor for feeding said containers to be labeled to said rotating carousel, said feeding star conveyor comprising a plurality of first clamp elements, which can move, during the rotation of said feeding star conveyor, about their own rotation axis, substantially in a vertical direction.

3. The labeling machine according to claim 2, wherein said feeding star conveyor is associated with a first movement device configured for moving said first clamp elements in a substantially vertical direction.

4. The labeling machine according to claim 3, wherein said first movement device comprises respective first linear actuators connected kinematically to at least one first clamp element.

5. The labeling machine according to claim 3, wherein said first movement device comprises a first cam-shaped profile which can be engaged slideably by said first supporting device during their rotation about a rotation axis of said feeding star conveyor.

6. The labeling machine according to claim 1, wherein at least one second conveyance device comprises an unloading star conveyor for unloading said labeled containers from said rotating carousel, said unloading star conveyor comprising a plurality of second clamp elements, which can move, during the rotation of said unloading star conveyor about its own rotation axis, in a vertical direction.

7. The labeling machine according to claim 6, wherein said unloading star conveyor is associated with a second movement device for moving, in a vertical direction, said second clamp elements.

8. The labeling machine according to claim 7, wherein said second movement device comprises respective second linear actuators connected kinematically to at least one second clamp element.

9. The labeling machine according to claim 7, wherein said second movement device comprises a second cam-shaped profile which can be engaged slideably by said second supporting device during their rotation about the rotation axis of said unloading star conveyor.

10. The labeling machine according to claim 1, wherein said feeding device comprises a transfer element which has a supporting surface at a fixed height for the bottom of the containers and is arranged directly upstream of said rotating carousel, said supporting surface being substantially at the same height as said supporting pans, there being, upstream of said transfer element, a first conveyance device associated with the first height variation device.

11. The labeling machine according to claim 10, wherein said first conveyance device comprises a star-shaped body associated with first supporting device which comprises first clamp elements intended to engage at a respective neck of a container, said first clamp elements being movable, during the rotation of the star-shaped body about its own rotation axis, substantially in a vertical direction, said star-shaped body being associated with a profile having a closed shape which can be engaged slideably by said first supporting device provided with first clamp elements adapted to receive the containers at a transfer portion.

12. The labeling machine according to claim 11, wherein a plane of arrangement of the closed shape profile can be moved on command about a tilting axis substantially horizontal and is arranged tangentially to the vertical cylindrical surface defined by the rotary motion of the containers about the rotation axis of the star-shaped body.

13. The labeling machine according to claim 12, wherein said tilting axis is arranged substantially at said transfer portion and is diametrically opposite to the release region of the containers at said transfer element.

14. The labeling machine according to claim 1, wherein said first height variation device and said second height variation device are adapted to produce a substantially identical height variation, in the opposite direction, of the bottom of said containers.

15. The labeling machine according to claim 1, wherein said first height variation device and said second height variation device are adapted to produce a different height variation, in an opposite direction, of the bottom of said containers.

* * * * *